US007333886B2

(12) United States Patent

Böhnig et al.

(10) Patent No.: US 7,333,886 B2

(45) Date of Patent: Feb. 19, 2008

(54) METHOD FOR ESTIMATING QUANTITY OF FUEL INJECTED

(75) Inventors: Ralf Böhnig, Regensburg (DE); Michael Hardt, Madrid (ES); Peter Ruβe, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/673,273

(22) Filed: Feb. 9, 2007

(65) Prior Publication Data

US 2007/0192019 A1 Aug. 16, 2007

(30) Foreign Application Priority Data

Feb. 10, 2006 (DE) ..................... 10 2006 006 303

(51) Int. Cl.
*G06F 19/00* (2006.01)
*G01L 3/26* (2006.01)

(52) U.S. Cl. .................................... 701/114; 73/119 A

(58) Field of Classification Search ........ 701/101–104, 701/114, 115; 123/494, 406.23, 406.58, 123/406.59, 478, 480; 73/116, 117.2, 117.3, 73/119 A, 119 R
See application file for complete search history.

(56) References Cited

U.S. PATENT DOCUMENTS

| | | | | |
|---|---|---|---|---|
| 6,705,294 | B2 * | 3/2004 | Shinogle | 123/486 |
| 6,732,577 | B2 * | 5/2004 | Leman et al. | 73/119 A |
| 6,748,928 | B2 * | 6/2004 | Shingole | 123/480 |
| 6,877,366 | B2 | 4/2005 | Rabl | 73/112 |
| 6,892,569 | B2 * | 5/2005 | Martin et al. | 73/119 A |
| 7,025,047 | B2 * | 4/2006 | Leman et al. | 123/486 |
| 2004/0099054 | A1 * | 5/2004 | Shinogle | 73/119 A |

FOREIGN PATENT DOCUMENTS

| | | | |
|---|---|---|---|
| DE | 198 09 173 | A1 | 9/1999 |
| DE | 41 22 139 | C2 | 7/2000 |
| DE | 199 45 618 | A1 | 3/2001 |
| DE | 43 19 677 | C2 | 8/2002 |
| DE | 102 52 988 | B3 | 6/2004 |
| DE | 102 54 477 | B3 | 6/2004 |

* cited by examiner

*Primary Examiner*—John T. Kwon
(74) *Attorney, Agent, or Firm*—Baker Botts L.L.P.

(57) ABSTRACT

In a method for estimating an injected quantity of fuel of an isolated injection, the segment time of the cylinder in which the isolated injection takes place is evaluated numerically by forming the second temporal derivation. With the aid of the second temporal derivation of the segment time the injection parameters are updated using test quantity-test torque characteristic map.

12 Claims, 2 Drawing Sheets

METHOD FOR ESTIMATING QUANTITY OF FUEL INJECTED

CROSS-REFERENCE TO RELATED APPLICATIONS

This application claims priority from German Patent Application No. 10 2006 006 303.1, which was filed on Feb. 10, 2006, and is incorporated herein by reference in its entirety.

TECHNICAL FIELD

The present invention relates to a method for estimating a quantity of fuel injected, especially an isolated injection, in an internal combustion engine with a number of cylinders.

BACKGROUND

It is necessary to estimate quantities of fuel injected in order to correctly identify the injection parameters of an injection system of an internal combustion engine and be able to draw conclusions about the correct functioning of the injection system. The consistent and reliable injection of a required quantity of fuel is decisive in order to meet the new European emission standards for motor vehicles. Undesired emissions from internal combustion engines are attributable in particular to the imprecise calibration of injection parameters in the area of small fuel masses.

Most motor vehicles possess a crankshaft sensor which detects the angular speed of the crankshaft. This variable provides an excellent source for obtaining dynamic variables which can be derived from individual combustions in the cylinder. Previous technical arrangements have employed a high-resolution noise measurement in the engine using one or more microphones or knock sensors. These are attached to the engine block close to the cylinder. According to a further alternative, cylinder pressures have been measured using cylinder pressure sensors. Cylinder pressure sensors can be arranged at various positions within the cylinder. The disadvantage of both these approaches however is that they are not installed as standard systems in motor vehicles and thus significantly increase the costs of manufacturing the motor vehicle.

DE 199 45 618 A1 for example discloses the use of a crankshaft sensor to enable the injection undertaken by the injection system to be derived from the speed irregularities caused by irregular combustion. DE 198 09 173 A1 discloses a timed fuel dispensing system with which small quantities of fuel are dispensed before the actual injection. With these small quantities of fuel tolerances and errors have a recognizable effect so that these can be taken into account in subsequent injection processes.

Other approaches describe the adaptation of the energy fed to the piezo-injection systems instead of the actuation time of the injection system, in order to identify and correct the injection parameters.

The disadvantage of the above methods is that they only allow the injection parameters to be checked with restricted accuracy and with a high equipment overhead.

SUMMARY

A more reliable method, which uses the normal equipment provided in a motor vehicle, may guarantee the checking and adaptation of the injection parameters. To this end, according to an embodiment, a method for estimating a quantity of fuel injected into an internal combustion engine with a number of cylinders, may comprise the steps of a) Injection and combustion of a test quantity of fuel in a cylinder of the internal combustion engine during a phase of deactivated fuel feed, b) Determining a segment time T(k) of the internal combustion engine from signals of a crankshaft sensor, c) Calculating the test torque C(k) generated by the combustion of the test quantity from a numerically determined second temporal derivation of the segment time T(k), and d) Determining a size of the test quantity from the test torque C(k) calculated, based on a test quantity-test torque characteristic map.

BRIEF DESCRIPTION OF THE DRAWINGS

The present invention and its embodiments are explained in greater detail below with reference to the accompanying drawing. The figures show.

DETAILED DESCRIPTION

Figure 1A:
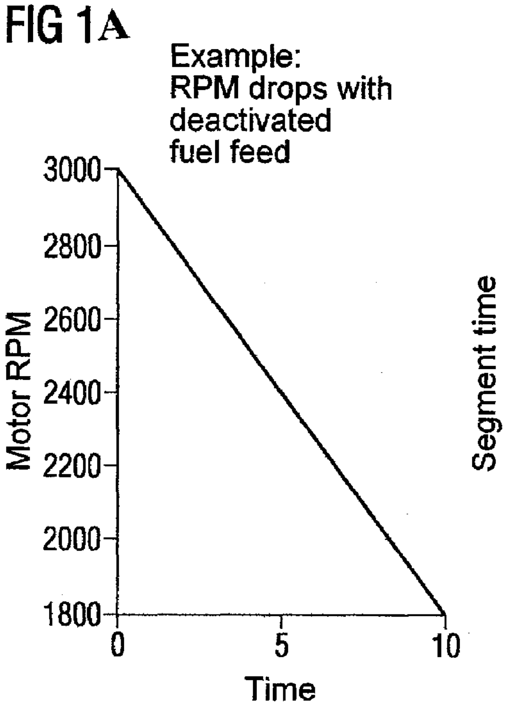
FIG. 1A contains an example for the drop in engine speed of the internal combustion engine in a phase when fuel feed is deactivated.

A method for estimating a quantity of fuel injected into an internal combustion engine with a number of cylinders, may comprise the following steps: Injection and combustion of a test quantity of fuel in a cylinder of the internal combustion engine during a phase of deactivated fuel feed, determining a segment time T(k) of the internal combustion engine from signals of a crankshaft sensor, calculating a test torque C(k) created by the combustion of the test quantity from a numerically determined second temporal derivation of the segment time T(k) and determining a size of the test quantity from the calculated test torque C(k) based on test quantity-test torque characteristic map.

The present method uses the signals provided by a crankshaft sensor which has now become part of the standard equipment of current motor vehicles. The combustion cycles taking place within the individual cylinders of the internal combustion engine are able to be evaluated with the aid of known crankshaft sensors. In accordance with the number of cylinders of the internal combustion engine, the overall 720° cycle of the internal combustion engine is subdivided into individual segments which can be used to describe the combustion in the individual cylinders. If the internal combustion engine is in a deactivated fuel feed stage, i.e. the driver is not requesting any torque via the gas pedal, while the motor vehicle is coasting, individual test quantities are injected into and ignited in individual cylinders of the internal combustion engine. Since these test quantities are small by comparison with quantities of fuel injected in normal coasting phases of the motor vehicle, the combustion of these test quantities has no negative effect on the driving behavior, such as causing juddering for example. Despite this the combustion of the injected test quantities generates a coasting torque or test torque which can be detected and evaluated by means of the crankshaft sensor. The injection and combustion of a test quantity has a direct effect on the segment time T(k) defined by the crankshaft sensor. This change in the segment time T(k), the level of which varies according to the size of the injected test quantity, is used in the present method for checking the injection time and thereby the functional integrity of injection system. To enable the phases of deactivated fuel feed to be used for checking the quantity of fuel injected independently of the movement state of the motor vehicle, the second temporal derivation of the segment time of the cylinder of internal combustion engine considered in each case is formed numerically from the measured values of the crankshaft sensor. The influence of different RPM ranges of the internal combustion engine can be excluded in this way for example, so that any given phases of deactivated fuel feed are jointly usable for estimating the quantity of fuel injected. The numerical second temporal derivation of the segment time T(k) represents the test torque C(k) created by the combustion of the test quantity or the amount of the torque contribution through the combustion of the test quantity. As soon as the test torque C(k) has been determined, test quantity-test torque characteristic map is used to establish which actual size of the test quantity corresponds to the test torque C(k) determined. The actual size of the test quantity determined on the basis of the characteristic map provides information about the degree to which the injection system of the internal combustion engine is actually injecting the required quantity of fuel or to which errors are present in the injection parameters. With this knowledge it is possible to constantly calibrate changes in the equipment of the injection system, in order to insure in this manner an optimum emission behavior of the internal combustion engine.

According to an embodiment, injection and combustion of a series of test quantities in a fuel feed broken down into one or into a number of phases of the internal combustion engine is undertaken and an average value of the test torque C(k) is calculated from the test torques which have been determined for each test quantity injected.

In accordance with a further embodiment, the test torque is calculated as a difference between the test torque after the injection of the test quantity and the test torque before the injection of the test quantity, meaning a phase of deactivated fuel feed without isolated injection.

It may be further preferred that a recursive updating of the average value of the test torque be performed with each further series of injected test quantities. The outstanding feature of updating the average value with each series is that the measured values of a number of series based on few test injections together form one injection estimation, without the need to wait for a series with a much greater number of test injections or for a sufficiently long series. This increases the effectiveness of the present method by comparison with the prior art.

The disclosed method is used for estimation and checking of the size of injected quantities of fuel which are injected in each case into one or more cylinders of an internal combustion engine. In this way it is established whether an injection system still fulfills the assumed injection parameters, so that optimum emission values of the internal combustion engine can be achieved.

Within the framework of the method fuel test quantities or isolated injections are injected into and burned in the individual cylinders in a phase during which fuel feed is deactivated. A phase of the internal combustion engine during which fuel feed is deactivated identifies a time segment in which the injection of fuel is being requested neither by the driver nor by other equipment of the internal combustion engine. In these phases there is ideally a linear drop over time of the engine speed, as is typically shown in FIG. 1A.

The linear drop in the engine speed shown in FIG. 1A corresponds to the unchanged moment of inertia within this phase. If for example the transmission ratio G is changed using a gear of the motor vehicle or if the crankshaft experiences disruptive forces as a result of bad road conditions, a sudden change in the moment of inertia on the crankshaft is produced so that the linear drop shown in FIG. 1A changes abruptly. These types of event would normally have negative effects on an evaluation algorithm based on the rotational speed of the internal combustion engine. A significant advantage of the various embodiments however lies in the fact that it is independent of the linear drop in the engine speed and is also little affected by isolated changes in the rate at which the engine speed declines.

Figure 2:
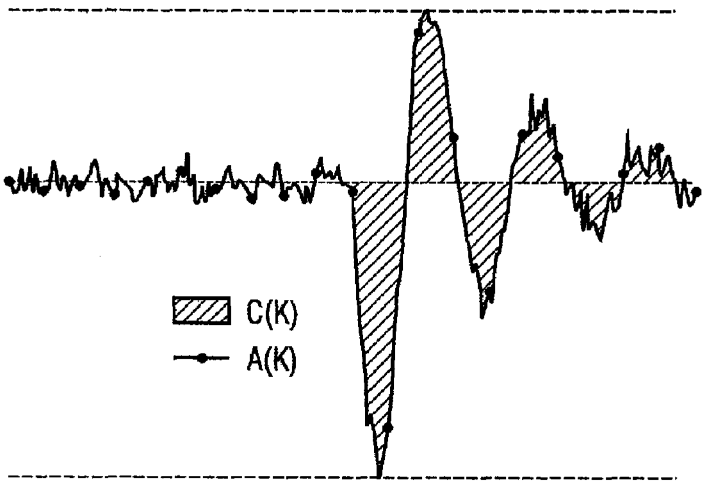
FIG. 2 shows the second derivation of the segment time T(k) calculated numerically from the measuring points of the crankshaft sensor.

The above identification of a phase of deactivated fuel feed corresponds to the first step of the flowchart in FIG. 2, which schematically represents an embodiment of the method. The segment time T(k) for an internal combustion engine with a number of cylinders designates the duration of a rotation of a cylinder, if the total time for a complete cycle of the internal combustion engine is divided by the number of cylinders of the internal combustion engine. The segment T(k) is able to be determined with the aid of the signals of the crankshaft sensor of the internal combustion engine. If for example a crankshaft sensor comprises 60 teeth and the internal combustion engine four cylinders, a complete cycle of the internal combustion engine is subdivided into four segments each with 30 teeth of the crankshaft sensor. Since these teeth are detected individually by the crankshaft sensor, the time for each segment can be determined in this way as a function of the speed N of the internal combustion engine. Since the speed of the internal combustion engine also varies the sampling rate of the crankshaft sensor, it is adapted in each case to a sufficient detection of the segment time T(k). If the segment time T(k) is described in seconds and if NR_CYL designates the number of cylinders of the internal combustion engine and N the speed of the internal combustion engine in $RPM^{-1}$, the segment time T(k) in the segment with the number k is calculated according to $$T(k) = \frac{120}{N(k) \cdot \mathrm{NR\_CYL}}. \tag{1}$$

Figure 1B:
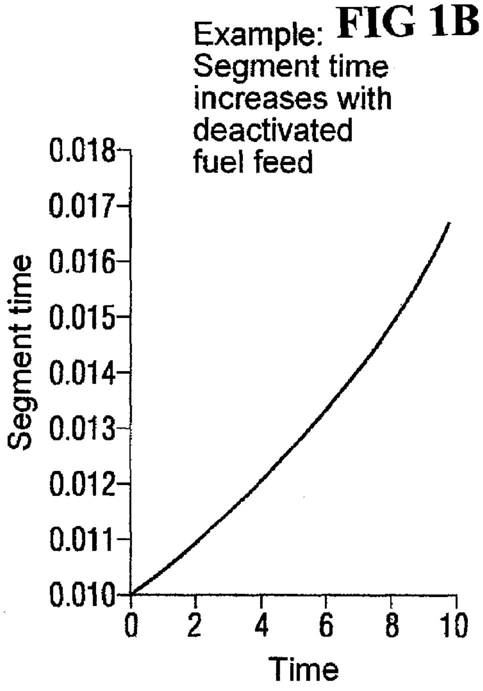
FIG. 1B shows an example of the increase in segment time T(k) as a function of time in a phase in which fuel feed is deactivated.

A typical curve for the segment time T(k) as a function of the time during a phase of deactivated fuel feed is shown in FIG. 1B. Here too the speed of the internal combustion engine drops during fuel feed deactivated phase in a linear manner over time, as shown by the example in FIG. 1A.

The method for estimating the size of the quantity of fuel injected or injected test quantities, which is also referred to as a method for determining characteristic values (cf. FIG. 3), is based on the second numeric temporal derivation of the segment time T(k). If the numerical derivation of the segment time T(k) is formed directly, the computational benefit of fewer multiplications and divisions is utilized to arrive at a value proportional to the injected test quantity of fuel. In this way rounding errors are reduced and the numerical range is significantly increased if the calculations are undertaken with the aid of fixed point arithmetic. The final value represents an average of the torque applied during the process of injecting the test quantity, which is created by the force produced by the combustion of the isolated injected test quantity of fuel during the segment time T(k). This final variable is referred to below as the combustion statistic or test torque C(k).

If the numeric temporal derivation D[x(k)] is applied to the function x(k), the following equation is produced $$D[x(k)] = \frac{x(k) - x(k-1)}{T(k)} \tag{2}$$

Equation (2) contains the assumption that the actual time term required ($t_2$-$t_1$) in the denominator approximately corresponds in accordance with a known temporal derivation to the segment time T(k). This assumption considerably simplifies the subsequent calculations. It is also conceivable to approximate the time term ($t_2$-$t_1$) by the average value 1/2·(T(k)−T(k−1)).

If, with reference to the equation (2), the second temporal derivation D[D[T(k)]] of the segment time T(k) is formed, the following equation is obtained $$A(k) = D[D[T(k)]] = \frac{T(k) \cdot T(k-2) - T^2(k-1)}{T^2(k) \cdot T(k-1)} \tag{3}$$

The formation of the second derivation removes the local quadratic form of the data of the segment time, as shown in FIG. 1B. Thus the result of this operation is arranged approximately around the zero point. The fact that the quadratic growth in the segment time T(k) as a function of the drop in the speed of the internal combustion engine "is lost" with the second temporal derivation essentially removes dependency of the segment time T(k) on the speed of the internal combustion engine.

The movement of the crankshaft system is modeled here by a second-order differential equation $\ddot{T}=f(T,\dot{T}$. In this case the aim of estimating the fuel quantity of an isolated injection is changed so that the resulting force is estimated which the crankshaft system experiences as a result of an isolated injection. After the evaluation of the experimental data is completed, this force is transmitted with the aid of test quantity-test torque characteristic map into the variable of the quantity of fuel injected. This characteristic map was determined experimentally beforehand specifically for the internal combustion engine. The size of this force is calculated as the norm of the differential equation $f(T,\dot{T})$ over a short period after isolated injection has taken place. The corresponding formula for this calculation is as follows $$C = \frac{1}{h}\int_t^{t+h} |f(T, \dot{T})| dt. \tag{4}$$

The test torque C(k) already mentioned above is discretely approximated within the framework of the present method with the aid of a weighted linear combination of A(k). Within the framework of this discrete approximation, A(k) is scaled over a time interval by means of a function of the transmission ratio G and the speed N of the internal combustion engine. The following equation is thus produced for the discrete approximation of the test torque C(k)

$$C(k) = \frac{1}{b(G(k), N(k))} \sum_{j=k}^{k-NR\_CYL-1} a(j)A(j), \quad a(j) \in \mathbb{R}. \tag{5}$$

FIG. 2 shows an example of the second numeric temporal derivation of the segment time which is influenced by the event of a representative isolated injection of a test quantity of fuel. The calculation of the test torque T(k) is represented by the cross-hatched area below the curve. The curve itself is formed by the function A(k) (see above). The points also shown represent sampled events during the engine cycle.

The combustion statistics or test torque T(k) has the approximate average value zero, if within the framework of the deactivated fuel feed phase no injection and ignition of a test quantity takes place. The variance of the test torque C(k) is estimated in phases in which no injection takes place. In this way the variability of the test torque C(k) to be expected is determined. In this connection major key variables of the system are taken into account, such as the speed of the internal combustion engine and different moments of inertia on the crankshaft for example. The estimated data scatter is used to recognize a system for which the hardware is in a state outside an acceptable range Furthermore the data distribution allows unacceptable operating conditions for the above evaluation to be detected, such as bad road conditions for example.

Figure 3:
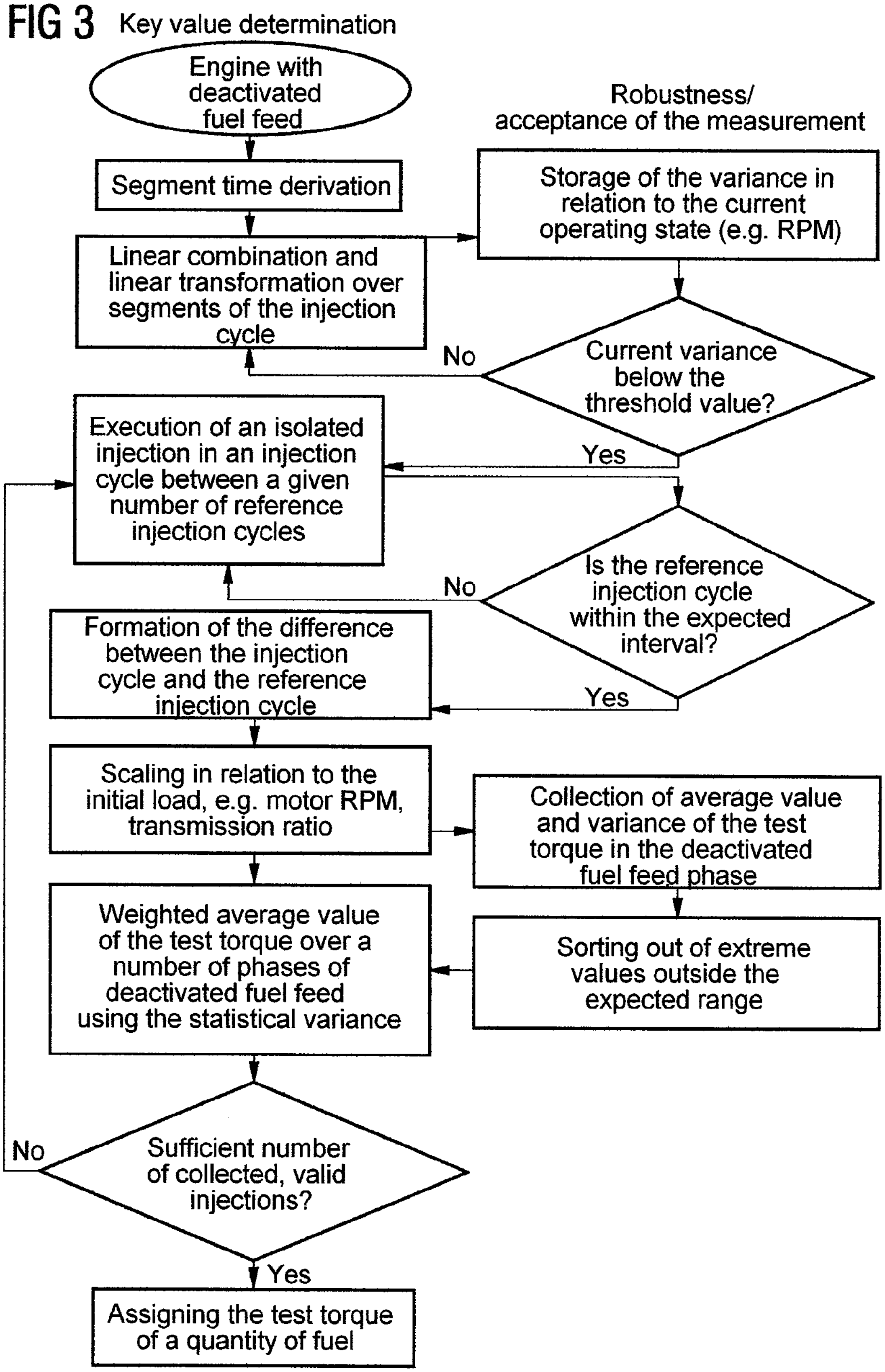
FIG. 3 shows a typical flowchart of the present method.

The determination of the characteristic data or the steps for estimating the size of the quantity of fuel of an isolated injection respectively are shown in FIG. 3. In parallel to this steps are shown for the robustness of the estimation method or for the acceptance of the measurements. Initially, in a third step of the flowchart of FIG. 3, equation (5) is applied over a number of segments of the engine cycle and in a phase in which fuel feed is deactivated. Since no test quantities are initially injected in this phase or no isolated injection is undertaken, the value C(k) determined enables the variance of the characteristic values to be determined depending on the operating state of the internal combustion engine and/or of the motor vehicle. If the variance lies within a previously defined threshold value the procedure is continued. Otherwise the measurement is repeated or another phase of deactivated fuel feed under other operating conditions of the motor vehicle is awaited and the measurement is then repeated.

On continuation of the measurement a test quantity is injected into a selected cylinder within the framework of an injection cycle of the internal combustion engine. The injection cycle is arranged between a given number of reference cycles in which no test quantities are injected. Comparison options in the further procedure are provided with the aid of the measurement of injection cycles and reference cycles. The isolated injection of a test quantity or of a series of test quantity injections is undertaken with identical control parameters for the injection apparatus in order to achieve comparability over a plurality of isolated injections. The corresponding test torques C(k) are determined in accordance with equation (5) and accumulated or stored. In the interests of the above-mentioned comparability, injection or engine cycles with injection of a test quantity are interchanged with injection or engine cycles without an injection of a test quantity.

An expected interval is defined with the aid of the variance of C(k) of the injection cycles already determined above without test quantity injection. If the measurement of C(k) of the reference cycle, i.e. without injection of test quantities, is outside the expected interval, the measured values of the following test quantity injection are not evaluated. Otherwise an appropriate evaluation of the test quantity injection is undertaken. The use of the expected interval guarantees that the data from the reference cycles can actually be used for evaluating the test torques C(k). If for example the motor vehicle drives over a pothole during a reference measurement, over a bad road or if the moment of inertia changes unpredictably in any other way on the crankshaft, fluctuations in C(k) of the reference cycle are created which cannot be evaluated. This prevents a reliable subsequent evaluation.

If the C(k) of the reference measurement is within the expected interval, the size of the test torque C(k) is calculated as the difference between the test torque $C_{after\_inj}(k)$ after the combustion of an isolated injection and the test torque $C_{before\_inj}(k-NR\_CYL)$ before the combustion of an isolated injection. This is also shown in the following equation 6.

$$C(k)=C_{after\_inj}(k)-C_{before\_inj}(k-NR\_CYL) \tag{6}$$

In this way it is not necessary to determine the force created solely from the isolated injection. Furthermore errors in determining the segment time with the aid of the crankshaft sensor no longer have any effect.

In the further method extreme values can be preferably removed from the collected C(k) values and an averaging of the collected C(k) values is undertaken within each series of isolated injections. These steps improve the accuracy and the robustness of the final estimation of the actual quantity of fuel injected. For each series of i isolated injections an average value and a variance of the results is calculated. Using this calculated data the removal of extreme values based on the assumption that the data scattering belongs to a Gaussian distribution is undertaken. The average value $\overline{C_i}$ of each series and the variance $var(C)_I$ of each series i is calculated from $$\overline{C_i} = \frac{1}{n_i}\sum_k C(k), \tag{7}$$

$$\mathrm{var}(C)_i = \left(\sum_k C^2(k) - n_i\overline{C_i^2}\right)\Big/(n_i-1)$$

Each series of injected test quantities or isolated injections can be determined in different phases of deactivated fuel feed. The average values of each series are collected until a sufficient number nT of evaluated injection events has been collected. The number of the injection events is then sufficient if a reliable estimation of the test torque created by the isolated injection in relation to the injection parameters remaining the same overall is possible The accuracy of this estimation naturally also affects the later determination of the actually injected test quantity based on the test quantity-test torque characteristic map.

The concluding average test torque $\overline{C}$ and the variance var(C) of the test results will be updated recursively with each series i of isolated injections. This is shown in the equations (8) below.

$$\overline{C} = \frac{n_T\overline{C} + n_i\overline{C_i}}{n_T + n_i}, \tag{8}$$

$$\mathrm{var}(C) = \frac{(n_T-1)\mathrm{var}(C) + (n_i-1)\mathrm{var}(C_i)}{n_T + n_i - 1}$$

$$n_T = n_T + n_i$$

The major advantage of the various embodiments lies in the fact that, despite the sporadic repeatability and duration of the phases of deactivated fuel feed, results with high accuracy and a low susceptibility in relation to other faults and changes in the peripheral conditions can be achieved. Averaging over a plurality of series of isolated injections and the recursive updating of the specific test torques makes it possible for even a slight change in the injection conditions for any of the variety of reasons to be taken into account when controlling the injection parameters. On this basis it is guaranteed that strict emission requirements are fulfilled.

Using the averaged and recursively updated test torques as the starting point, the actual injected sizes of the test quantities are derived from the test quantity-test torque characteristic map. The knowledge of the actual sizes of the test quantities in its turn makes it possible to calibrate the control parameters, for example of an injection system, and to tailor them to the requirements of the respective internal combustion engine.

The invention claimed is:

1. A method for estimating a quantity of fuel injected into an internal combustion engine with a number of cylinders, comprising the steps of:

a) Injection and combustion of a test quantity of fuel in a cylinder of the internal combustion engine during a phase of deactivated fuel feed, b) Determining a segment time T(k) of the internal combustion engine from signals of a crankshaft sensor, c) Calculating the test torque C(k) generated by the combustion of the test quantity from a numerically determined second temporal derivation of the segment time T(k) and d) Determining a size of the test quantity from the test torque C(k) calculated, based on a test quantity-test torque characteristic map.

2. The method as claimed in claim 1, comprising the further step of:

Injection and combustion of a series of test quantities in one or in a plurality of phases of interrupted fuel feed of the internal combustion engine and Calculating an average value of the test torque C(k) from the test torques which have been determined for each test quantity injected.

3. The method as claimed in claim 1, comprising the further step of:

Calculating the test torque from the difference between the test torque after the injection of the test quantity and the test torque before the injection of the test quantity.

4. The method as claimed in claim 2, comprising the further step of:

Recursive updating of the average value of the test torque with each further series of injected test quantities.

5. A method for estimating a quantity of fuel injected into an internal combustion engine, comprising the steps of:

a) Injection of a test quantity of fuel into a cylinder of the internal combustion engine during a phase of deactivated fuel feed, b) Igniting the injected test quantity, b) Determining a segment time T(k) from signals of a crankshaft sensor, c) Calculating a test torque C(k) generated by the combustion of the test quantity from a numerically determined second temporal derivation of the segment time T(k) and d) Determining a size of the test quantity from the test torque C(k), based on a test quantity-test torque characteristic map.

6. The method as claimed in claim 5, comprising the further steps of:

Injection and combustion of a series of test quantities in one or in a plurality of phases of interrupted fuel feed of the internal combustion engine, and Calculating an average value of the test torque C(k) from the test torques which have been determined for each test quantity injected.

7. The method as claimed in claim 5, comprising the further step of:

Calculating the test torque from the difference between the test torque after the injection of the test quantity and the test torque before the injection of the test quantity.

8. The method as claimed in claim 7, comprising the further step of:

Recursive updating of the average value of the test torque with each further series of injected test quantities.

9. A system for estimating a quantity of fuel injected into an internal combustion engine with a number of cylinders, comprising:

a) Means for Injecting and combusting of a test quantity of fuel in a cylinder of the internal combustion engine during a phase of deactivated fuel feed, b) Means for determining a segment time T(k) of the internal combustion engine from signals of a crankshaft sensor, c) Means for calculating the test torque C(k) generated by the combustion of the test quantity from a numerically determined second temporal derivation of the segment time T(k), and d) Means for determining a size of the test quantity from the test torque C(k) calculated, based on a test quantity-test torque characteristic map.

10. The system as claimed in claim 9, further comprising:

Means for injecting and combusting of a series of test quantities in one or in a plurality of phases of interrupted fuel feed of the internal combustion engine, and Means for calculating an average value of the test torque C(k) from the test torques which have been determined for each test quantity injected.

11. The system as claimed in claim 9, further comprising:

Means for calculating the test torque from the difference between the test torque after the injection of the test quantity and the test torque before the injection of the test quantity.

12. The system as claimed in claim 11, further comprising:

Means for recursive updating of the average value of the test torque with each further series of injected test quantities.

* * * * *